US011216514B2

(12) United States Patent
Statia et al.

(10) Patent No.: US 11,216,514 B2
(45) Date of Patent: *Jan. 4, 2022

(54) SECURE DNS QUERY

(71) Applicant: Microsoft Technology Licensing, LLC, Redmond, WA (US)

(72) Inventors: Jeromy S. Statia, Duvall, WA (US); Christopher J. Engdahl, Seattle, WA (US); Lee Walker, Christiansburg, VA (US); William Dixon, Munich (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 446 days.

This patent is subject to a terminal disclaimer.

(21) Appl. No.: 15/662,922

(22) Filed: Jul. 28, 2017

(65) Prior Publication Data

US 2017/0329850 A1 Nov. 16, 2017

Related U.S. Application Data

(63) Continuation of application No. 14/594,340, filed on Jan. 12, 2015, now Pat. No. 9,740,781, which is a (Continued)

(51) Int. Cl.
*H04L 29/12* (2006.01)
*H04L 29/06* (2006.01)
*G06F 16/951* (2019.01)

(52) U.S. Cl.
CPC ...... *G06F 16/951* (2019.01); *H04L 29/12066* (2013.01); *H04L 61/1511* (2013.01);
(Continued)

(58) Field of Classification Search
CPC . G06F 16/951; G06F 16/25; H04L 29/12066; H04L 61/1511; H04L 61/6068;
(Continued)

(56) References Cited

U.S. PATENT DOCUMENTS 7,251,694 B2 7/2007 Gupta et al.
7,296,155 B1 * 11/2007 Trostle ............... H04L 63/1441
713/170
(Continued)

OTHER PUBLICATIONS

Ateniese, et al., "A New Approach to Dns Security (Dnssec)", Conference on Computer and Communications Security, Date: 2001, pp. 86-95, ACM, New York, USA.
(Continued)

*Primary Examiner* — Jesse P Frumkin
(74) *Attorney, Agent, or Firm* — Chin IP, PLLC

(57) ABSTRACT

A secure DNS query may be made by establishing a secure connection with a specific DNS server to determine an address for a hostname. A client device may have a database that may contain a record of a secure DNS server for one or more hostnames. When a DNS request contains one of the specified hostnames, an authenticated session may be created with the designated secure DNS server and a network address for the hostname is returned using the session. The authenticated session may authenticate a client device to the server as well as authenticate the server to the client. In some embodiments, the secure DNS server may accept connections from authenticated clients and may disregard connection requests from non authenticated clients.

20 Claims, 3 Drawing Sheets

Related U.S. Application Data continuation of application No. 11/980,928, filed on Oct. 31, 2007, now Pat. No. 8,935,748.

(52) U.S. Cl.
CPC .......... *H04L 63/00* (2013.01); *H04L 63/0236* (2013.01); *H04L 61/6068* (2013.01); *H04L 63/08* (2013.01)

(58) Field of Classification Search
CPC ............... H04L 63/08; H04L 29/08288; H04L 67/1036; H04L 61/20; H04L 63/0236; H04L 63/00; H04L 63/10
See application file for complete search history.

(56) References Cited

U.S. PATENT DOCUMENTS

| | | | |
|---|---|---|---|
| 7,299,491 B2* | 11/2007 | Shelest | H04L 63/08 726/26 |
| 7,562,384 B1* | 7/2009 | Huang | H04L 63/164 713/170 |
| 7,945,666 B2* | 5/2011 | Wunner | H04L 29/06 370/401 |
| 8,935,748 B2 | 1/2015 | Statia et al. | |
| 2001/0042201 A1* | 11/2001 | Yamaguchi | H04L 63/20 713/151 |
| 2003/0070067 A1 | 4/2003 | Saito | |
| 2003/0187882 A1 | 10/2003 | Jinmei et al. | |
| 2004/0039798 A1 | 2/2004 | Hotz et al. | |
| 2004/0143579 A1 | 7/2004 | Nakazawa | |
| 2004/0194102 A1 | 9/2004 | Neerdaels | |
| 2004/0250119 A1 | 12/2004 | Shelest et al. | |
| 2006/0167871 A1* | 7/2006 | Sorenson | H04L 61/157 |
| 2007/0124487 A1 | 5/2007 | Yoshimoto et al. | |
| 2007/0150611 A1 | 6/2007 | Chan et al. | |
| 2009/0019523 A1* | 1/2009 | Takahashi | H04L 63/105 726/3 |
| 2009/0043900 A1* | 2/2009 | Barber | H04L 29/12801 709/228 |
| 2009/0055929 A1* | 2/2009 | Lee | H04L 61/1511 726/23 |
| 2010/0049982 A1* | 2/2010 | Migault | H04L 61/1511 713/176 |

OTHER PUBLICATIONS

Davidowicz, "Domain Name System (DNS) Security", Date: 1999, 22 pages.
Rikitake, et al., "DNS Transport Size Issues in IPv6 Environment", Issue: 26-30, Date: Jan. 2004, pp. 141-145.
"Final Office Action Issued in U.S. Appl. No. 11/980,928", dated May 25, 2011, 17 Pages.
"Non Final Office Action Issued in U.S. Appl. No. 11/980,928", dated Mar. 21, 2014, 16 Pages.
"Non Final Office Action Issued in U.S. Appl. No. 11/980,928", dated Nov. 29, 2010, 18 Pages.
"Notice of Allowance Issued in U.S. Appl. No. 11/980,928", dated Aug. 26, 2014, 5 Pages.
"Final Office Action Issued in U.S. Appl. No. 14/594,340", dated Dec. 14, 2016, 6 Pages.
"Non Final Office Action Issued in U.S. Appl. No. 14/594,340", dated Aug. 23, 2016, 7 Pages.
"Notice of Allowance Issued in U.S. Appl. No. 14/594,340", dated Apr. 17, 2017, 8 Pages.

* cited by examiner

NETWORK WITH A SECURE DNS SERVER

SECURE DNS QUERY

CROSS-REFERENCE TO RELATED APPLICATION(S)

This application is a continuation of U.S. patent application Ser. No. 14/594,340, filed Jan. 12, 2015, entitled "SECURE DNS QUERY,", which is a continuation of U.S. patent application Ser. No. 11/980,928, filed Oct. 31, 2007, entitled "SECURE DNS QUERY," now U.S. Pat. No. 8,935,748, issued Jan. 13, 2015. The entirety of each of these afore-mentioned application(s) is incorporated herein by reference.

BACKGROUND

Domain Name Service (DNS) is a technology used within various networks, including the Internet, to resolve a text based hostname, such as www.example.com to an Internet Protocol (IP) address such as 208.77.188.166. Many applications, such as web browsers, may use the DNS service to resolve names when making various queries or establishing connections across a network. In many private networks, such as a company or home intranet, a DNS service may service DNS requests within the network and, when a query fails within the local network, a query may roll over to an Internet or wide area network DNS service.

SUMMARY

A secure DNS query may be made by establishing a secure connection with a specific DNS server to determine an address for a hostname. A client device may have a database that may contain a record of a secure DNS server for one or more hostnames. When a DNS request contains one of the specified hostnames, an authenticated session may be created with the designated secure DNS server and a network address for the hostname is returned using the session. The authenticated session may authenticate a client device to the server as well as authenticate the server to the client. In some embodiments, the secure DNS server may accept connections from authenticated clients and may disregard connection requests from non authenticated clients.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
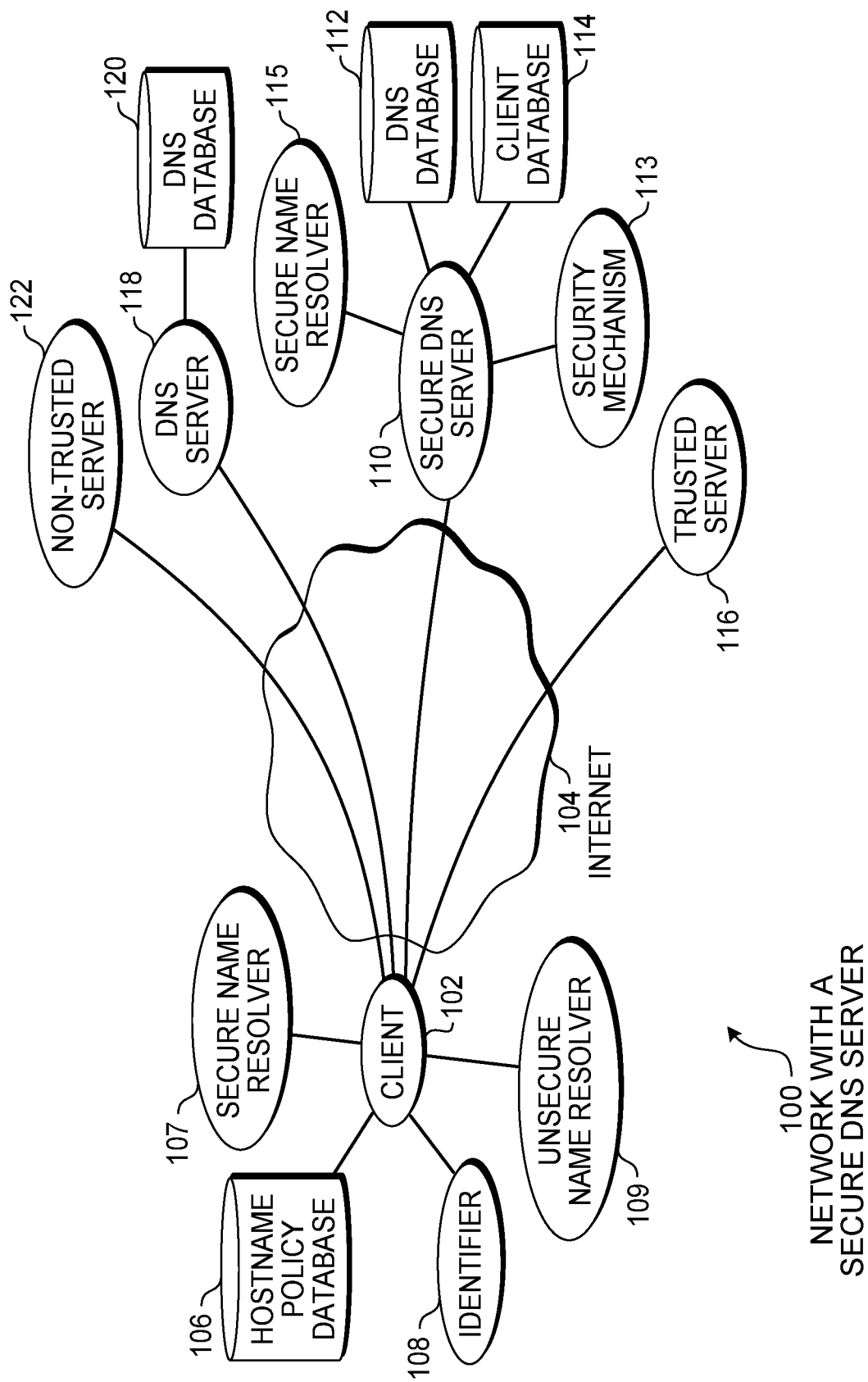
FIG. 1 is a diagram illustration of an embodiment showing a network with a secure DNS sever.

A secure domain name system (DNS) server may be queried for a list of predefined hostnames. The secure DNS server may be accessed by a predefined network address from a client device, and mutual authentication or other security measures may be used to verify that a DNS query with the secure DNS server is authentic and accurate.

A secure DNS server may be used to thwart various 'man in the middle' attacks where a client's DNS query may be intercepted and the client may be redirected to a malicious server in place of a desired server. Such a system may also be used to avoid corrupt records in public or shared DNS servers.

A secure DNS server may be used for giving access to hosts that are not available through a public DNS call. For example, a corporate network may have several access points that may be used by employees or by customers. Such access points may be made available through a secure DNS server that may return addresses for hostnames that are not available through a public DNS system.

A client device may include a table or other database that contains hostnames that may be queried using a secure DNS server. When a hostname is presented to the client DNS query engine, a secure connection may be made to the secure DNS server to obtain an authenticated and reliable network address for the hostname. If a hostname is presented that is not contained in the database, a non-secure DNS query may be made. The hostnames in the database may be a predefined list of hostnames that may be, for example, to secure sites or other sites where a misdirected DNS query may be a security concern.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a network with a secure DNS server. Embodiment 100 is a simplified example used to highlight various characteristics, features, and uses of a secure DNS server.

The diagram of FIG. 1 illustrates functional components of a system and may not correspond directly with a hardware or software component of a system. In some cases, a component may be a hardware component, a software component, or a combination of hardware and software. Hardware components may include general purpose components adaptable to perform many different tasks or specially designed components that may be optimized to perform a very specific function. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the various functions described.

Embodiment 100 is an example of a system that includes a secure DNS server. The secure DNS server may be used to respond to DNS queries for a set of hostnames that is contained on a client device. Requests for network addresses for other hostnames may be handled using a non-secure DNS server.

Requests that are routed to a secure DNS server may be authenticated and may be performed using various security mechanisms. In many cases, the client may authenticate itself to the server and the server may authenticate itself to the client. In some cases, a secure session may be established using various secure protocols including Internet Protocol Security (IPsec), Secure Sockets Layer (SSL), or some other secure protocol. Transmissions within the secure session may additionally be encrypted.

A client 102 may be connected to the Internet 104 or other network, including a local area network or a wide area network. The client 102 may have a secure name resolver 107 that may resolve a hostname address for a given hostname using a secure DNS server 110 in some cases. An example of the operation of a secure name resolver is given in embodiment 200 contained in this specification. Similarly, the client 102 may have an unsecure name resolver 109 that may resolve hostname addresses using an unsecure DNS server 118.

The client 102 may have a hostname policy database 106 that may contain a set of hostnames and an address or other identifier such as a hostname of a secure DNS server 110. The database 106 may be queried for each DNS query to determine if a requested hostname corresponds to a secure DNS server. When a requested hostname does correspond with a secure DNS server, a connection is established with the secure DNS server 110 for the query.

Figure 3:
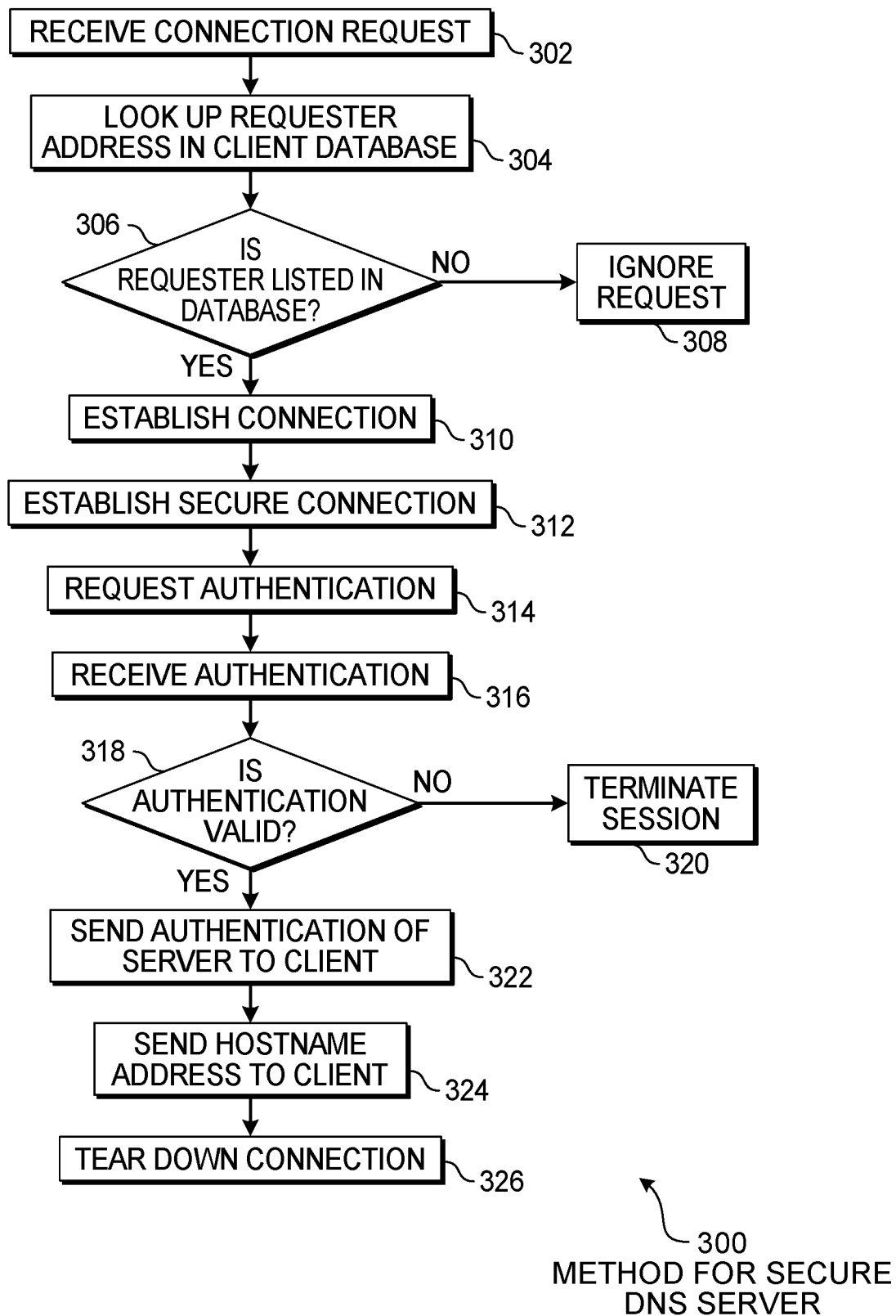
FIG. 3 is a flowchart illustration of an embodiment showing a method for operations of a secure DNS server when processing a secure DNS request from a client.

In many cases, a connection between the client 102 and the secure DNS server 110 may be established after the client 102 transmits an identifier 108 to the secure DNS server 110. The identifier 108 may be used to authenticate the client 102 to the secure DNS server 110. The secure DNS server 110 may contain a security mechanism 113 that may provide various authentication, encryption, and security mechanisms for communicating with the client 102. The secure DNS server 110 may include a secure name resolver 115 that may be the operational portion of the secure DNS server 110 that processes hostname address requests from a client 102 in a secure and/or authenticated manner. An example of the operations of a secure name resolver 115 is illustrated in FIG. 3.

During an initial transmission to establish a connection with the secure DNS server 110, the client 102 may transmit an identifier 108. In many cases, the identifier 108 may include an IP address in an initial communications packet. The IP address may be screened by the secure DNS server 110 to determine if the client IP address is permitted to access the secure DNS server 110.

During subsequent communications, the client 102 may transmit other forms of an identifier 108 to authenticate the client 102 to the secure DNS server 110. For example, the client 102 may transmit a Media Access Control (MAC) address, a hardware serial number such as a processor serial number, or use other hardware identifiers. Other examples may include transmitting a serial number that may be stored in a hardware dongle, access card, or some other identifier.

In some cases, a user-level identifier 108 may be transmitted to the secure DNS server 110. A user-level identifier 108 may be an identifier such as a user name, verification from a fingerprint reader, an authenticated voice print, retina scan, or output from other types of physiological reading devices.

The identifier 108 may be used by the secure DNS server 110 during various stages of a session to determine that the client 102 is authenticated and permitted to perform a DNS query.

The secure DNS server 110 may have a client database 114 and a DNS database 112. The client database 114 may contain identifiers for various client devices to compare to the authentication identifier 108 that may be transmitted by the client 102. In many cases, the client database 114 may contain IP addresses or ranges of addresses that may be permitted to establish secure sessions with the secure DNS server 110. In many embodiments, the secure DNS server

110 may reject or ignore communication requests from devices that have IP addresses outside of a predefined range of devices.

The DNS database 112 may contain records that match hostnames with IP or network addresses for various hosts. In many embodiments, the secure DNS server 110 may be used to provide DNS services for a small number of hosts.

In an example, a company may have a group of servers that may be used for secure sessions by employees. Each employee may access the company servers by first establishing a connection with the secure DNS server 110, authenticating with the secure DNS server 110, and receiving a network address for a company server, which may be a trusted server 116. After receiving the network address to the company server, each client may establish a connection with the company server.

In many embodiments, a connection established with an address received from a secure DNS server 110 may be a secure connection. In a typical use scenario, the hostnames requested from the secure DNS server 110 may be hostnames for connections that are security sensitive. As such, the subsequent connections with the hosts may be secure connections.

In some embodiments, the secure DNS server 110 may provide network addresses for a small list of hostnames. For example, a secure DNS server may be used for address resolution for employees of a company who wish the access a secure access point for a company network. In such a case, the secure DNS server may contain only one record of a hostname to network address map.

In other embodiments, the secure DNS server 110 may provide a secure DNS service for a large number of hostnames. In such cases, the secure DNS server 110 may be used to provide an authenticated, accurate, and in some cases a guaranteed DNS service that may provide secure DNS services to any client device. Such a case may enable the general public to establish a secure connection with a secure DNS server and receive address information to avoid 'man in the middle' attacks. Such an attack may be where a network interloper may intercept an outgoing or returning DNS query and respond with an address that directs the client to a malicious or undesired server rather than an intended server.

In some such embodiments, the secure DNS server 110 may be used to avoid DNS queries to various unsecure DNS servers 118 that may contain corrupt or incorrect records in the DNS database 120. When a corrupt record enters the DNS system, the record may propagate through various caches and servers for a considerable amount of time before the record is expunged or overwritten. When the secure DNS server 110 is used for large numbers of DNS queries, the secure DNS server 110 may be populated with authenticated or verified DNS records.

In embodiments where the secure DNS server 110 is used for large numbers of DNS records, the secure DNS server 110 may provide authentication to the client 102 but the client 102 may not provide authentication to the secure DNS server 110. In such an embodiment, the secure DNS server 110 may establish a connection using IPsec, SSL, or other secure technologies. Some such technologies may allow for one way authentication from the server to the client but may not enforce authentication from the client to the server.

When a client 102 accesses the secure DNS server 110, an authentication may be recorded for the requesting device. Such a record may be made in the client database 114 and used to audit the connection requests for specific hostnames.

In some embodiments, a database of authenticated clients may be kept and used for security analysis or other recordkeeping.

In cases where the client 102 makes a request for an address using a hostname that is not in the hostname policy database 106, the client 102 may make a DNS request from the unsecure DNS server 118. The DNS server 118 may have a DNS database 120 that may contain multitudes of DNS entries for large numbers of hostnames across the network, including the Internet. In general, the DNS server 118 may direct a client 102 to a non-trusted server 122 by responding to a request for an address when given a hostname associated with the server 122.

In many embodiments, the client 102 may attempt to obtain a network address by accessing the hostname policy database 106 first, and if an entry is found, making a connection to a secure DNS server 110. If no entry is found, a query may be made to an unsecure DNS server 118. In many such embodiments, when an entry is found in the hostname policy database 106 and the connection fails for some reason, the client 102 may be prevented from making the same query of the unsecure DNS server 118.

Figure 2:
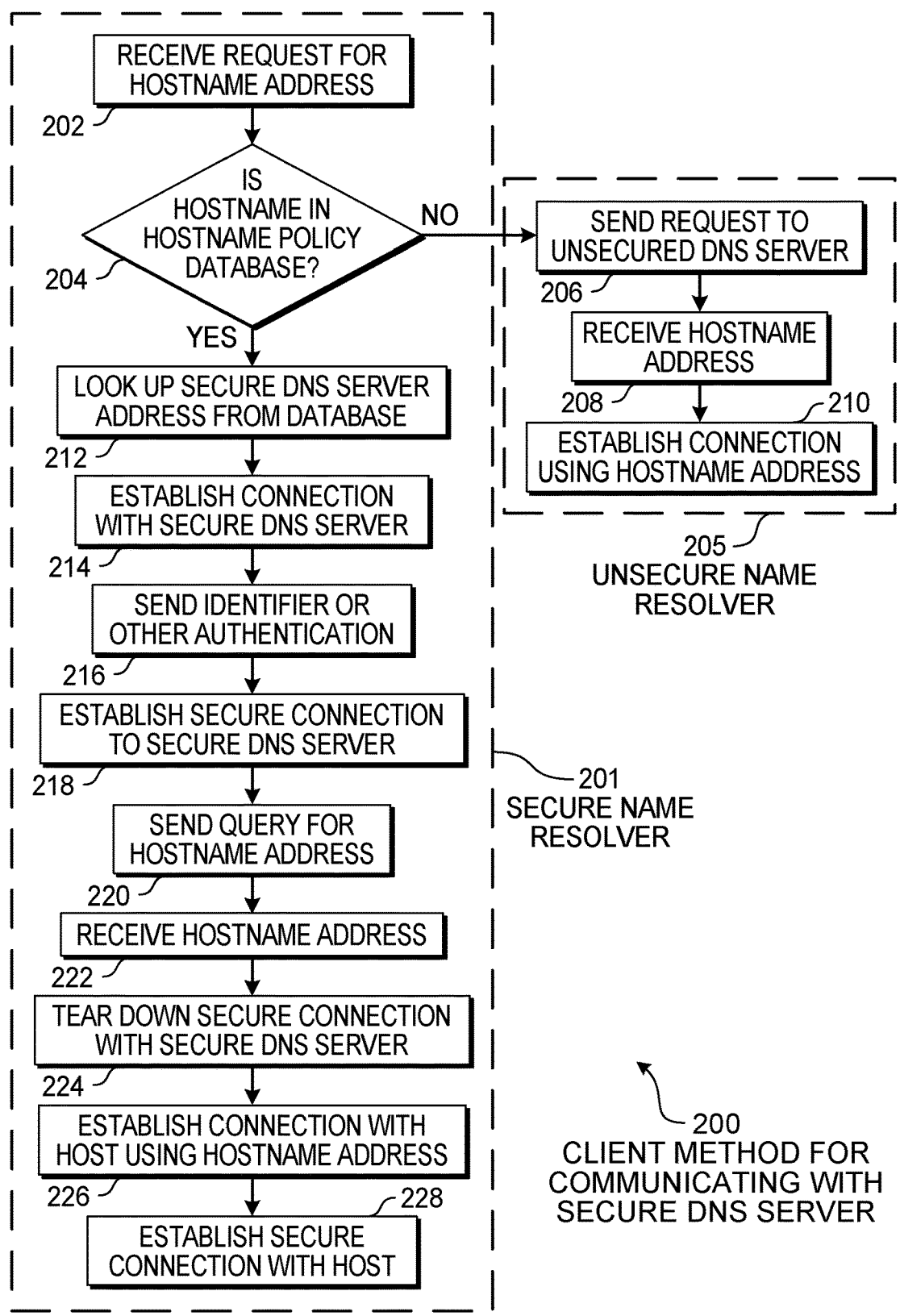
FIG. 2 is a flowchart illustration of an embodiment showing a method for communicating with a secure DNS server by a client.

FIG. 2 is a flowchart illustration of an embodiment 200 showing a client method for communicating with a secure DNS server. The embodiment 200 illustrates a simplified example of actions performed by a client and may illustrate some of the steps that may be performed in order to engage a secure DNS server and receive a network address that corresponds to a hostname. Other embodiments may use different terminology or nomenclature and may include additional steps or may combine two or more steps into a single step. In other embodiments, some steps illustrated as serial may be performed in parallel and vice versa.

Embodiment 200 is an example of a method for communicating with a secure DNS server, which may include secure name resolver steps 201 and unsecure name resolver steps 205 that may correspond with the secure name resolver 107 and unsecure name resolver 109 in FIG. 1.

In the method of embodiment 200, a request for a hostname address is received in block 202 and if the hostname is found in a hostname policy database in block 204, the process continues to perform a request with a secure DNS server. If the hostname is not found in a hostname policy database in block 204, an unsecured DNS request may be performed.

In many embodiments, a client device may check an incoming DNS request against a hostname policy database to determine if the hostname is associated with a secure DNS server or not. When the hostname is found in the hostname policy database, the client may proceed with a secure DNS connection.

In many embodiments, once the client begins a secure DNS connection, it may be prevented from rolling over to an unsecure DNS request. In such a situation, a failure with a secure DNS request may result in a failed DNS request and the client's subsequent connection to a requested host may not be completed. This logic may be applied when a 'man in the middle' attack may be suspected and an unsecure DNS request may make the client vulnerable.

An unsecured DNS request may be performed by sending the request to an unsecured DNS server in block 206, a hostname address may be received in block 208, and a connection may be established using the hostname address in block 210. In many cases, communications with unsecured DNS servers may be made using User Datagram Protocol or UDP. UDP is a low-overhead communication protocol that may transmit short messages across a network in a relatively unsecure manner. UDP is generally more efficient than other, more complex protocols.

The unsecured DNS request may be vulnerable to 'man in the middle' attacks where one or more portions of the unsecure DNS request may be intercepted and changed by a malicious network interloper. When an unsecure DNS request is changed, a client may be redirected to a malicious host rather than an intended host without realizing that the redirection has happened.

For example, a 'man in the middle' attack may be performed when a user on a client device attempts to access the user's bank account using a web browser. A DNS request may be generated by the web browser, and the request may include the hostname for the user's bank. A malicious interloper may identify the DNS request for the bank and send a response to the client device for a false website that appears similar to the bank's website. The unsuspecting user may be tricked into giving account information, user identification, passwords, or other sensitive information to the false website. Such information may be used by the interloper for accessing the bank's website without the user's knowledge.

The 'man in the middle' attack may occur at different stages of the DNS query. In a first type of attack, a DNS request may be redirected to a false or malicious DNS server that responds with an improper address for a hostname. In this type of attack, the interloper may intercept a DNS request being sent from the client to the DNS server.

In a second type of attack, an interloper may intercept the return message from a DNS server to the client and may change the contents of the return message to redirect a client device to a malicious host. In a variation of the second type of attack, an interloper may surreptitiously change the client's outgoing message to request an address for a different hostname from the DNS server.

In the first type of attack, the client device may unknowingly communicate with a malicious DNS server. In the second type of attack, the client may communicate with a proper DNS server but the communication between the client and DNS server may be intercepted and changed.

A secure DNS query may help to thwart the first type of 'man in the middle' attack by authenticating the DNS server to the client so that the client is assured that the DNS server is indeed the proper server. Additionally, the second type of attack may be thwarted when a secure connection may be established between the client and DNS server.

In some embodiments, a secure DNS server may be used to dispense addresses for hostnames that are not publicly available through unsecured DNS servers. An example may be a corporate network that may make some access points available to limited groups of people, such as customers or employees. Such access points may be available through a secure DNS server that contains DNS records that may not be found in public DNS records.

A secure DNS request may be processed by looking up a secure DNS server address from the hostname policy database in block 212. The hostname policy database may have one or more records that contain a secure DNS server address that corresponds to a hostname. In some embodiments, addresses for two or more secure DNS servers may be listed for a particular hostname. In such an embodiment, the client may attempt to connect to one of the secure DNS servers and, if the connection fails, may attempt to connect to another secure DNS server listed for the particular hostname. Such logic is not illustrated in embodiment 200.

After determining an address for a secure DNS server in block 212, a connection is made with the secure DNS server in block 214. In many embodiments, the connection in block 214 may be preliminary handshaking for the establishment of a secure connection.

In some embodiments, an address for a secure DNS server may be resolved from a hostname or other identifier. The hostname may be located in the database in block 212 and resolved using a query to a DNS server, such as a public DNS server, and the connection established in block 214 with the address received from the public DNS query.

The client may transmit an identifier or other authentication to the secure DNS server in block 216. In some embodiments, a client may send two or more different items that may serve as an identifier.

When a client establishes a connection with a secure DNS server in block 214, the client may transmit a network address such as an IP address in the initial communication. In some embodiments, a secure DNS server may check that network address against a list of permitted network addresses to determine if the client is permitted communication with the secure DNS server. In such embodiments, the network address may serve as one form of authentication for a client device.

Some embodiments may establish a communication session and perform additional authentication in block 216. For example, a client device may transmit a hardware related identifier, such as a Media Access Control (MAC) address, a serial number attached to a processor or other hardware, an identifier stored in an access card or dongle, or some other identifier associated with a client hardware device. In another example, a client device may transmit a user related identifier, such as a username, password, results from a fingerprint reader, or some other identifier.

A secure DNS server may use an identifier to authenticate the client. In some embodiments, the client may be authenticated so that the secure DNS server can verify that the client has permission to access the host associated with the requested network address.

A secure connection may be established between the client and secure DNS server in block 218. In some embodiments, authentication of the client to the secure DNS server may occur before or after a secure connection is established.

A secure connection may be established using any type of security mechanism. In some cases, a Layer 3 protocol such as IPsec may be used to establish a secure session. In other cases, higher layer protocols such as SSL may be used. In some embodiments, a secure connection may include mutual authentication and may also include encryption of messages passed between the devices. A secure connection may thwart various malicious attacks where communications are intercepted and changed between a client and a secure DNS server.

Once a secure connection is established, a query may be transmitted by a client in block 220 and a hostname address returned in block 222. The secure connection may be torn down in block 224.

The client may establish a connection with the desired host using the hostname address in block 226 and may establish a secure connection with the host in block 228.

In many embodiments, an error handling procedure may be included in a client method for communicating with a secure DNS server. For example, if a connection to a secure DNS server is not successful, the client may prevent an unsecure DNS query from being performed. In another example, if a failure occurs when attempting to connect with a first secure DNS server, a second secure DNS server may be attempted when two or more secure DNS servers are provided in the hostname policy database.

FIG. 3 is a flowchart illustration of an embodiment 300 showing a method for a secure DNS server. The embodiment 300 illustrates a simplified example of actions performed by a secure DNS server when communicating with a client that requests a network address for a hostname. Embodiment 300 may correspond with the operations of a secure name resolver 115 as illustrated in FIG. 1. Other embodiments may use different terminology or nomenclature and may include additional steps or may combine two or more steps into a single step. In other embodiments, some steps illustrated as serial may be performed in parallel and vice versa.

A connection request may be received in block 302. In many cases, a communication request may include a network address for a requesting client. The requester address may be looked up in a client database in block 304. If the requester is not in the client database in block 306, the request for communication may be ignored in block 308.

Some embodiments may not use a network address for an initial determination of whether or not to accept a request for communication. In some cases, such as a secure DNS server used by employees to access a corporation's private access points, employees may connect to the Internet and be provided network addresses from coffee shops, hotels, or other access points, making the network address a poor authenticator of the requestor in such situations.

A connection may be established in block 310 with the client. A secure connection may be established in block 312. In some cases, a secure connection may be established in a single step, while in other cases, an unsecure connection may be established first before a series of authentication and handshaking steps may be performed before a secure version of the connection is established.

The secure connection may use several different technologies, including IPsec, various encryption technologies, SSL, or other secure technologies.

The secure DNS server may request authentication in block 314 and receive authentication in block 316. If the authentication is not valid in block 318, the session may be terminated in block 320. In some cases, an error message or other communication may be sent in addition to terminating the session in block 320.

If the authentication is valid in block 318, the secure DNS server may transmit authentication to the client device in block 322. Such authentication may be in the form of an encryption device or code that may be used to decode transmissions. In other embodiments, the authentication may be an identifier that may be used by the client device to compare to a predefined identifier to verify the authenticity of the secure DNS server.

After the authentication and security measures are complete, the hostname address may be transmitted in block 324 and the connection may be torn down in block 326.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
receiving a first request for a first network address of a first node having a first name;
determining, based on a record from a local database, an Internet Protocol (IP) address of a remote secure DNS server that is to be employed in resolving the first name, wherein the record associates the remote secure DNS server to requests to resolve the first name;
establishing a secure connection with the remote secure DNS server at the IP address;
sending, over the secure connection, the first name to the remote secure DNS server as a query for a network address of the first node; and
receiving the first network address in response to the query.

2. The method of claim 1, further comprising:
receiving a second request for a second network address of a second node having a second name;
looking up the second name in the local database;
not finding the second name in the local database; and
querying another DNS server for the second network address.

3. The method of claim 1, further comprising:
receiving a second request for a second network address of a second node having a second name;
determining that the local database associates the second name with a second network address of another remote secure DNS server;
attempting to establish a secure connection with the other remote secure DNS server at the second network address;
failing to establish the secure connection with the other remote secure DNS server at the second network address; and
terminating further DNS queries for the second name.

4. The method of claim 1, wherein establishing the secure connection includes use of a Layer 3 security mechanism.

5. The method of claim 4, wherein the Layer 3 security mechanism comprises IPsec.

6. The method of claim 1, wherein establishing the secure connection includes transmitting an identifier of a user to the remote secure DNS server.

7. The method of claim 1, wherein establishing the secure connection includes transmitting an identifier for a node to the remote secure DNS server.

8. The method of claim 1, further comprising:
establishing communications with the first node using the received first network address.

9. A computing device, comprising:
at least one memory and at least one hardware-based instruction execution system, wherein the at least one memory and the at least one hardware-based instruction execution system are configured to:
store a database that includes a mapping of an Internet Protocol (IP) address of a remote secure DNS server address to at least one host name;
receive a request for a network address of a first node having a first name;
retrieve, based on the mapping, the IP address of the remote secure DNS server as an indication that the remote secure DNS server is to be employed in obtaining the network address of the first node;
establish a secure connection with the remote secure DNS server at the retrieved IP address of the remote secure DNS server;
sending, over the secure connection, the first name to the remote secure DNS server as a query for the network address of the first node; and receive the network address of the first node via the secure connection.

10. The computing device of claim 9, wherein the at least one memory and the at least one hardware-based instruction execution system are further configured to:
receive a request for a network address of a second name;
determine, that the database does not include any mapping for the second name; and
perform a DNS query with an unsecured name resolver for the network address of the second name.

11. The computing device of claim 9, wherein the at least one memory and the at least one hardware-based instruction execution system are further configured to:
receive a request for a network address of a second node having a second name;
retrieve, from the database, an IP address of another remote secure DNS server;
attempt to establish a secure connection with the other remote secure DNS server at the retrieved IP address of the other remote secure DNS server;
fail to establish the secure connection with the other remote secure DNS server; and
terminate further DNS queries for the network address associated with the second name.

12. The computing device of claim 9, wherein establishing the secure connection comprised use of a Layer 3 security mechanism.

13. The computing device of claim 12, wherein the Layer 3 security mechanism comprises IPsec.

14. The computing device of claim 9, wherein the at least one memory and the at least one hardware-based instruction execution system are further configured to transmit a unique identifier to the remote secure DNS server as part of establishment of the secure connection.

15. A computing device, comprising:
at least one memory and at least one processor, wherein the at least one memory and the at least one processor are respectively configured to store and execute instruction for causing the computing device to:
store a local name resolution database comprising a plurality of mappings between hostnames of one or more nodes and network addresses of respective ones of the one or more nodes;
receive a request from a first remote client node, the request being in response to a mapping on the first remote client node associating a hostname being resolved by the first remote client node to an Internet Protocol (IP) address of the computing device;
establish a secure connection with the first remote client node;
determine, based on at least one of the plurality of mappings, a network address of the hostname being resolved by the first remote client node; and
provide the network address to the first remote client node via the established secure connection.

16. The computing device of claim 15, wherein the instructions are also for causing the computing device to:
store a database of authorized clients; and
refuse to communicate with a second remote client node that is not listed in the database of authorized clients.

17. The computing device of claim 15, wherein:
the instructions are also for causing the computing device to:
store a database of authorized clients; and
the establishment of the secure connection with the first remote client node includes:
establishment of the secure connection with the first remote client node in response to an identifier of the first remote client device being associated with an entry in the database of authorized clients.

18. The computing device of claim 17, wherein the identifier is a Media Access Control (MAC) address or a hardware identifier of the first remote client node.

19. The computing device of claim 15, wherein the instructions are also for causing the computing device to:
receive a unique identifier of the first remote client node.

20. The computing device of claim 19, wherein the instructions are also for causing the computing device to:
determine, based on the received unique identifier of the first remote client device, whether the first remote client node is authorized to access a secure DNS server on the computing device.

* * * * *